United States Patent Office 3,517,788
Patented June 30, 1970

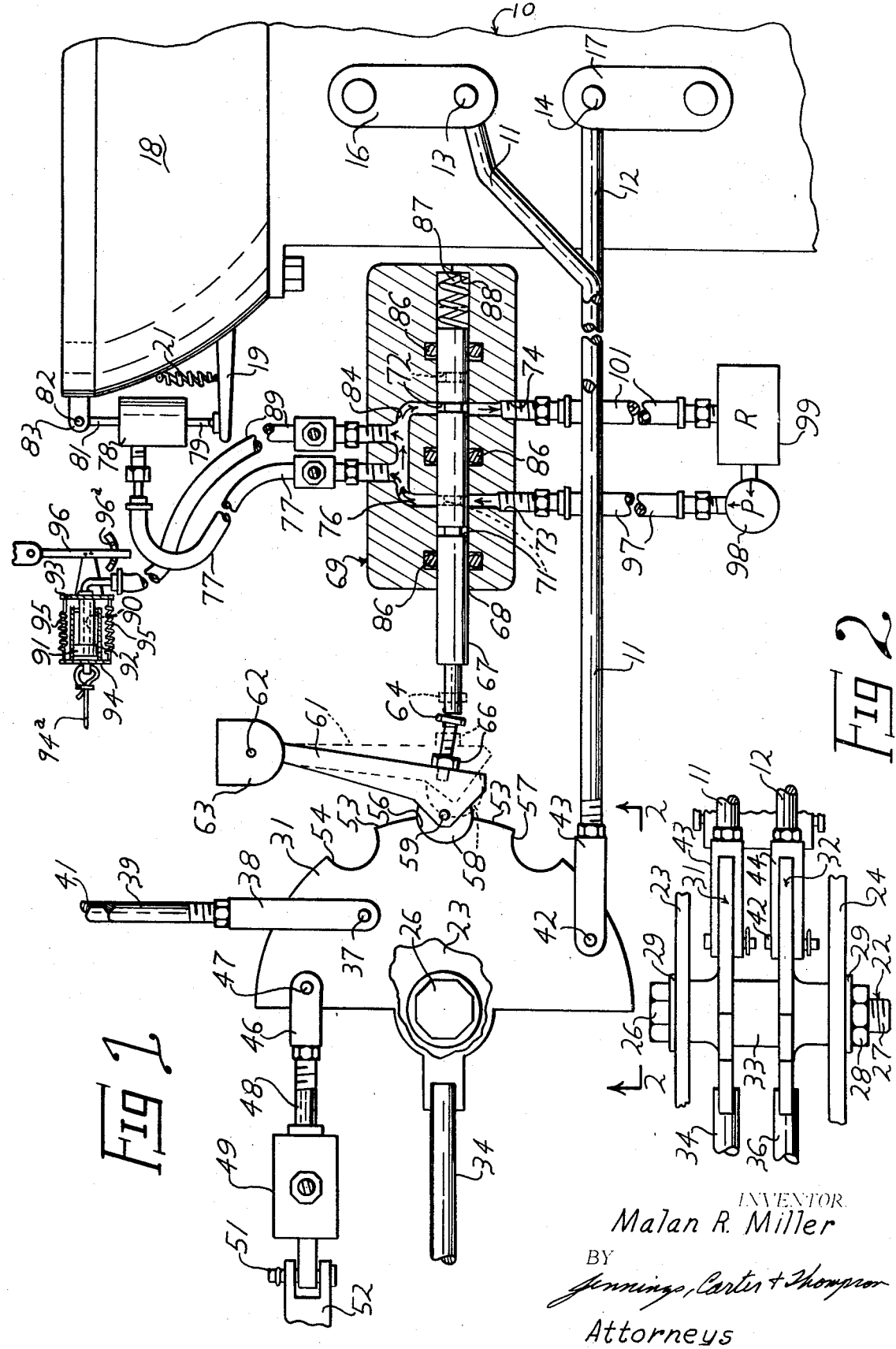

3,517,788
CLUTCH RELEASE AND GEAR CHANGE
MECHANISM FOR TRANSMISSION
Malan R. Miller, Rte. 2, Box 57, Parrish, Ala. 35580
Filed June 20, 1968, Ser. No. 738,589
Int. Cl. F16d 67/00
U.S. Cl. 192—3.5                                    2 Claims

ABSTRACT OF THE DISCLOSURE

Clutch releasing and gear actuating mechanism embodying a pivoted plate having an arcuate peripheral edge with angularly spaced recesses therein. A cam moves inward within selected recesses to an outer position in contact with the peripheral edge. Inward and outward movement of the cam moves a control valve to a first position and to a second position to release and engage the clutch upon movement of the control valve to the second and first positions, respectively. The plate moves gear changing mechanism upon continued rotation of the plate after the cam moves outward.

BACKGROUND OF THE INVENTION

This invention relates to clutch release and gear changing mechanism for a transmission and more particularly to such mechanism which permits the clutch to be released and the gears changed by a single operation of an actuating member.

Heretofore in the art to which my invention relates, difficulties have been encountered in releasing the clutch and shifting the gears in transmission systems, such as transmission systems for concrete mixing trucks and the like. This is especially true in view of the fact that dual control systems are provided for such transmissions, one control system being within the cab of the vehicle and the other control system being in easy reach of the operator as he discharges concrete from the drum which is usually rotated in one direction to charge the concrete and is rotated in the opposite direction to discharge the concrete therefrom. Another object of my invention is to provide apparatus for releasing the clutch and actuating the gear changing mechanism of a transmission in which the power unit for the transmission is slowed down to idle speed as the gears are changed to prevent excessive wear to the clutch unit.

Apparatus embodying features of my invention is illustrated in the accompanying drawing, forming a part of this application, in which:

FIG. 1 is a top diagrammatic view, partly broken away and in section, showing the mechanism for releasing the clutch and actuating the gear changing mechanism; and FIG. 2 is a fragmental view taken generally along the line 2—2 of FIG. 1.

Referring now to the drawing for a better understanding of my invention, I show a fragment of a transmision unit generally at 10. The gears of the transmission unit 10 are actuated by conventional type actuating rods 11 and 12 which are pivotally connected as at 13 and 14 to links 16 and 17, respectively. The other ends of the links 16 and 17 are connected to the gear changing mechanism in a manner well understood in the art to which my invention relates. The transmission unit 10 is also provided with the usual clutch unit indicated at 18 which is actuated by a clutch lever 19 which is urged toward engaged position by a suitable spring 21.

My improved means for releasing the clutch and changing the gears of the transmission unit 10 comprises a vertical shaft 22 extending through suitable openings provided in spaced apart walls 23 and 24 of a housing unit, as shown in FIG. 2. The shaft 22 is provided with a head 26 at one end thereof and is threaded as at 27 adjacent the other end thereof for receiving a nut 28. Suitable washers 29 are interposed between the walls 23 and 24 and the head 26 and nut 28, as shown in FIG. 2. Mounted for pivotal movement about the shaft 22 are spaced apart plate-like members 31 and 32. A suitable spacer member 33 is interposed between the plate-like members 31 and 32 whereby the plate-like members rotate in planes which are parallel to each other. Secured rigidly to the plate-like members 31 and 32 are outwardly projecting handle members 34 and 36 for rotating the plate-like members to selected angular positions.

Pivotally connected to the plate-like members 31 and 32 by pivot pins 37 are clevis members 38 which in turn are secured to the adjacent ends of actuating rods 39 and 41. The other ends of the arms 39 and 41 are connected to operating levers which are mounted within the cab of a vehicle carrying the apparatus. In view of the fact that such operating levers are of the conventional type well known in the art, no further description thereof is deemed necessary.

Also pivotally connected to the plate-like members 31 and 32 by suitable pivot pins 42 are clevis members 43 and 44 which are carried by the adjacent ends of the rods 11 and 12, respectively. As shown in FIG. 1, clevis members 46 are pivotally connected to each plate-like member 31 and 32 by a pivot pin 47. Each clevis member 46 is secured to the end of an actuating rod 48 which in turn is connected to the movable element of a dash-pot unit indicated generally at 49. The other end of the dash pot unit 49 is connected by a pivot pin 51 to a stationary support member 52, as shown.

As shown in FIG. 1, an arcuate peripheral edge 53 is provided on each plate-like member 31 and 32. Angularly spaced recesses 54, 56 and 57 are provided in the peripheral edge 53 for receiving a cam member 58 whereby the cam member is adapted for movement to an inner position within selected ones of the recesses 54, 56 or 57 and to an outer position in contact with the peripheral edge 53 located between the recesses, as shown in FIG. 1. The cam member 58 is shown as being in the form of a roller which is mounted on a shaft 59 carried by one end of an arm 61 with the other end of the arm being pivotally connected by a pivot pin 62 to support bracket 63. Accordingly, the free end of the arm 61 is adapted to move from the solid line position, with the roller 58 in selected ones of the recesses, to the dotted line position while the roller 58 is riding on the peripheral edge 53. Adjustably connected to the arm 61 adjacent the free end thereof is a laterally projecting actuating member 64. A suitable lock nut 66 holds the actuating member 64 at selected positions.

As shown in FIG. 1, the actuating member 64 is adapted to engage an adjacent end of a piston-like member 67 which is mounted for movement in a longitudinally extending bore 68 provided in a valve body 69. Longitudinally spaced, annular recesses 71 and 72 are provided in the piston-like member 67, as shown in FIG. 1. An inlet port 73 is provided in the valve body 69 in position to communicate with the annular recess 71 while the member 67 is in the dotted line position shown in FIG. 1. That is, the annular recesses 71 and 72 move to the dotted line position as the cam member 58 moves from selected ones of the recesses 54, 56 or 57 outwardly onto the peripheral edge 53. An exhaust 74 is provided in the valve body 69 in position to communicate with the annular recess 72 while recess 72 is in the solid line position shown in FIG. 1. That is, the exhaust port 74 communicates with the annular recess 72 while the cam member 58 is within selected ones of the recesses 54, 56 or 57.

A discharge port 76 is provided in the valve body 69 in position to communicate with the annular recess 71 while it is in the dotted line position shown in FIG. 1. Communicating with the discharge port 76 is one end of a conduit 77 having its other end communicating with a fluid pressure operated cylinder 78. The cylinder 78 is provided with a piston rod 79 which is operatively connected to the outer end of the clutch lever 19, as shown. The other end of the fluid pressure operated cylinder 78 is connected by a rod 81 to a pivot pin 82 which in turn is supported by a bracket 83. Also communicating with the discharge port 76 is an exhaust port 84 which in turn communicates with the annular recess 72 while it is in the solid line position shown in FIG 1.

Suitable annular seals 86 are provided at opposite sides of the annular recesses 71 and 72 to provide an effective seal between the piston-like members 67 and the bore 68. Also, a spring member 87 is mounted between the end of the piston-like member 67 and a spring seat 88 formed in the valve body 69, as shown. That is, the spring 87 is interposed between the valve body 69 and the end of the piston-like member 67 opposite the end thereof which is engaged by the actuating member 64 whereby the piston-like member is urged toward the cam member 58.

Communicating with the discharge port 76 is a second conduit 89 which in turn communicates with a through passageway 90 in an elongated piston 91. Surrounding and mounted for sliding movement relative to the piston 91 is a cylinder 92. End plates 93 and 94 are carried by the piston 91 and the cylinder 92, respectively. Spring members 95 connect the end plates 93 and 94 to each other and urge the end plates toward each other. The end plate 93 is connected to a throttle lever 96 which engages spaced apart notches 96a whereby it is held at selected positions. The end plate 94 is connected to a conventional type throttle linkage 94a to reduce the speed of rotation of the power unit for the transmission 10 each time the control valve is moved to communicate the conduit 89 with the annular recess 71 and the fluid supply port 73. That is, the fluid pressure operated cylinder 92 is actuated and moved relative to piston 91 each time the fluid pressure operated cylinder 78 is actuated to reduce the speed of rotation of the power unit each time the clutch 18 is disengaged. The inlet port 73 communicates with a supply conduit 97 which in turn communicates with a pump 98 that receives fluid from a reservoir 99. The exhaust port 74 communicates with a conduit 101 which also communicates with the reservoir 99 to return fluid thereto.

From the foregoing description, the operation of my improved apparatus will be readily understood. The intermediate recess 56 is adapted to receive the cam member 58 while the transmission unit 10 is in a neutral position or setting. The recesses 54 and 57 are in position to receive the cam member 58 when the transmission unit is in selected gear positions or settings. To change the gears from a neutral setting to a selected gear setting as represented by either of the recesses 54 or 57, the actuating arm 34 or 36 is moved in the proper direction to cause the plate-like member 31 or 32, as the case may be, to move in the proper direction whereby the roller 58 moves out of recess 56 and then engages the peripheral edge 53. This outward movement of the cam member 58 moves the piston-like member 67 toward the right, as viewed in FIG. 1 whereby the annular recess 71 moves to the dotted line position to thus supply fluid under pressure to the discharge port 76 whereupon fluid is supplied under pressure to cylinders 78 and 92 by conduits 77 and 89, respectively. Accordingly, while the annular recess 71 is in the dotted line position shown in FIG. 1, the cylinder 78 is actuated to release the clutch unit 18 and the cylinder 92 is actuated or moved relative to piston 91 to reduce the speed of rotation of the power unit. Continued movement of the actuating member 34 causes the cam member 58 to move into a selected recess 54 or 57 whereupon the piston-like member 67 moves toward the left, as viewed in FIG. 1, to thus return the annular recess 71 to the solid line position shown in FIG. 1. In this position, the annular recess 72 communicates the exhaust ports 84 and 74 with each other whereby fluid is free to move through conduit 101 to reservoir 99. The clutch arm 19 and the piston rod 79 are returned to an inner position by the tension spring 21. The piston-like member 67 is urged toward the solid line position shown in FIG. 1 by the compression spring 87 whereby the cam member 58 is moved to the solid line position shown in FIG. 1 as the cam member moves into alignment with selected ones of the recesses 54 or 57, as the case may be.

It will be understood that instead of moving the plate-like members 31 and 32 by the control arms 34 and 36, the plate-like members may be rotated by actuating the rods 39 and 41 from a position within the cab of the vehicle. While I have shown a reservoir 99 for supplying fluid, it will be apparent that where the fluid under pressure is a gas, such as air, a suitable compressor is employed. Air may be supplied from an air tank which is already provided on many concrete mixing trucks and the like.

From the foregoing, it will be seen that I have devised an improved mechanism for releasing the clutch and actuating the gear changing mechanism of a transmission. By providing means for automatically releasing the clutch each time the gear shift mechanism is actuated I provide for smooth changing of the gears by the continuous movement of a single actuating arm. Also, by providing the fluid pressure operated cylinder 92 for actuating the throttle linkage to reduce the speed of rotation of the power unit, I greatly reduce the wear on the clutch unit 18. Furthermore, by providing a control valve which automatically introduces fluid under pressure to the cylinders 78 and 92 each time the cam member 58 moves to the outer position in engagement with the peripheral edge 53 and automatically returns the fluid to the reservoir 99 each time the cam member 58 moves into engagement with the recesses 54 or 57, my improved apparatus is trouble free in operation and requires a minimum of parts for the construction thereof.

While I have shown my invention in but one form, it will be obvious to those skilled in the art that it is not so limited, but is susceptible of various other changes and modifications without departing from the spirit thereof.

What I claim is:

1. In apparatus for releasing the clutch and actuating the gear changing mechanism of a transmission which is operatively connected to a power unit,
   (a) a plurality of plate-like members mounted for pivotal movement about a common axis to selected angular positions with each having an arcuate peripheral edge at a side thereof,
   (b) there being angularly spaced recesses in each said peripheral edge,
   (c) a cam member adjacent each plate-like member and mounted for movement to an inner position within selected ones of said recesses to an outer position in contact with said peripheral edge between said recesses,
   (d) an outwardly projecting actuating handle carried by each plate-like member for rotating selected ones of said plate-like members to selected angular positions for said cam member to engage selected ones of said recesses and said peripheral edge therebetween,
   (e) a control valve operatively connected to said cam member and movable to a first position in response to movement of said cam member into either of said recesses and movable to a second position in response to movement of said cam member outwardly into engagement with said peripheral edge, (f) means supplying fluid under pressure to said control valve, (g) a fluid pressure operated cylinder operatively connected to said control valve and the clutch and operable to release said clutch upon movement of said control valve to said second position and to engage said clutch upon movement of said control valve to said first position, and (h) means operatively connecting said plate-like member to said gear changing mechanism to change gears in response to rotation of said plate-like member after said cam member moves outwardly of a recess into engagement with said peripheral edge to release said clutch each time the gear changing mechanism is actuated.

2. Apparatus for releasing the clutch and actuating the gear changing mechanism of a transmission as defined in claim 1 in which a dash pot unit is operatively connected to each said plate-like member to absorb some of the shock as the plate-like member is rotated to selected positions relative to said cam member.

References Cited

UNITED STATES PATENTS

| | | |
|---|---|---|
| 2,248,431 | 7/1941 | Leukhardt. |
| 2,273,277 | 2/1942 | Leukhardt. |
| 2,294,823 | 9/1942 | Andres. |
| 2,362,242 | 11/1944 | Casler. |
| 2,966,972 | 1/1961 | Nallinger. |
| 3,262,523 | 7/1966 | Gordon. |

BENJAMIN W. WYCHE III, Primary Examiner

U.S. Cl. X.R.

74—858; 137—596.1; 192—.098; 251—251